1,755,520

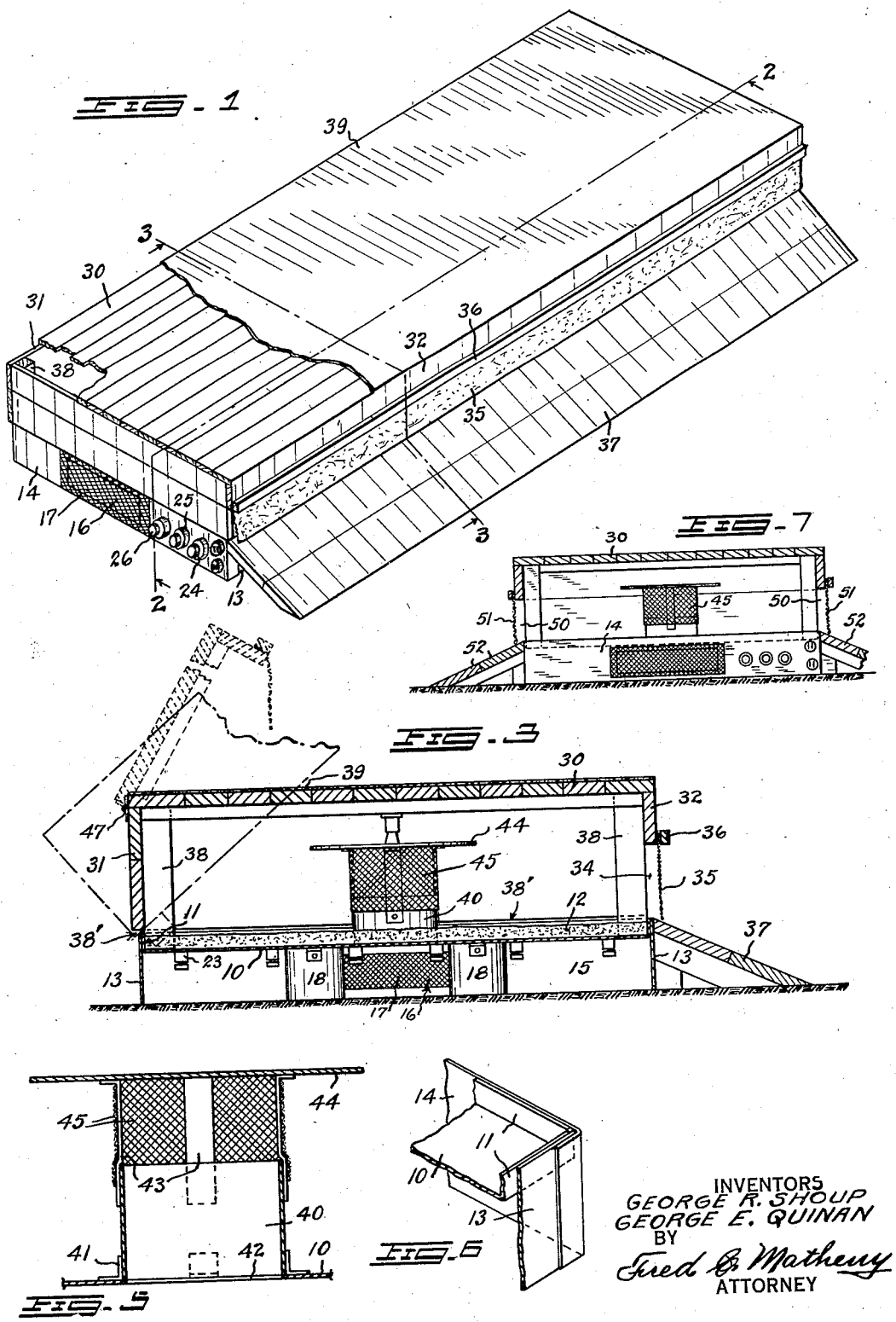
April 22, 1930. G. R. SHOUP ET AL 1,755,520
POULTRY BROODER
Filed May 3, 1927 2 Sheets-Sheet 1
INVENTORS
GEORGE R. SHOUP
GEORGE E. QUINAN
BY
Fred C. Matheny
ATTORNEY April 22, 1930. G. R. SHOUP ET AL 1,755,520
POULTRY BROODER
Filed May 3, 1927 2 Sheets-Sheet 2
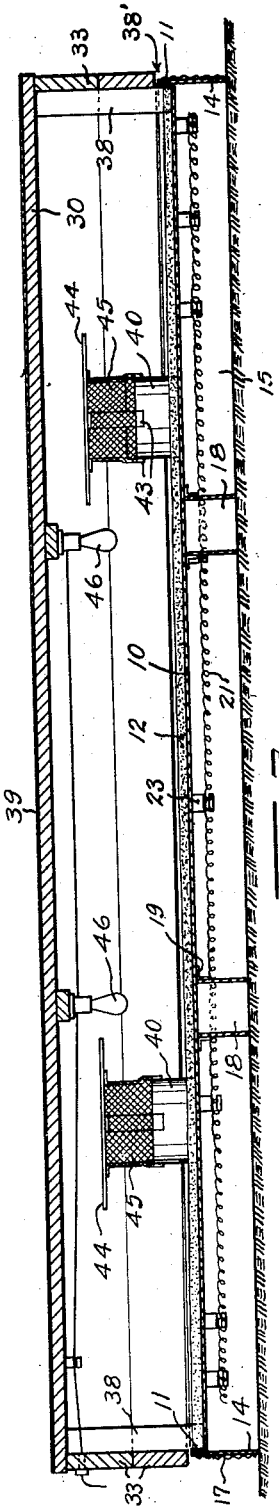
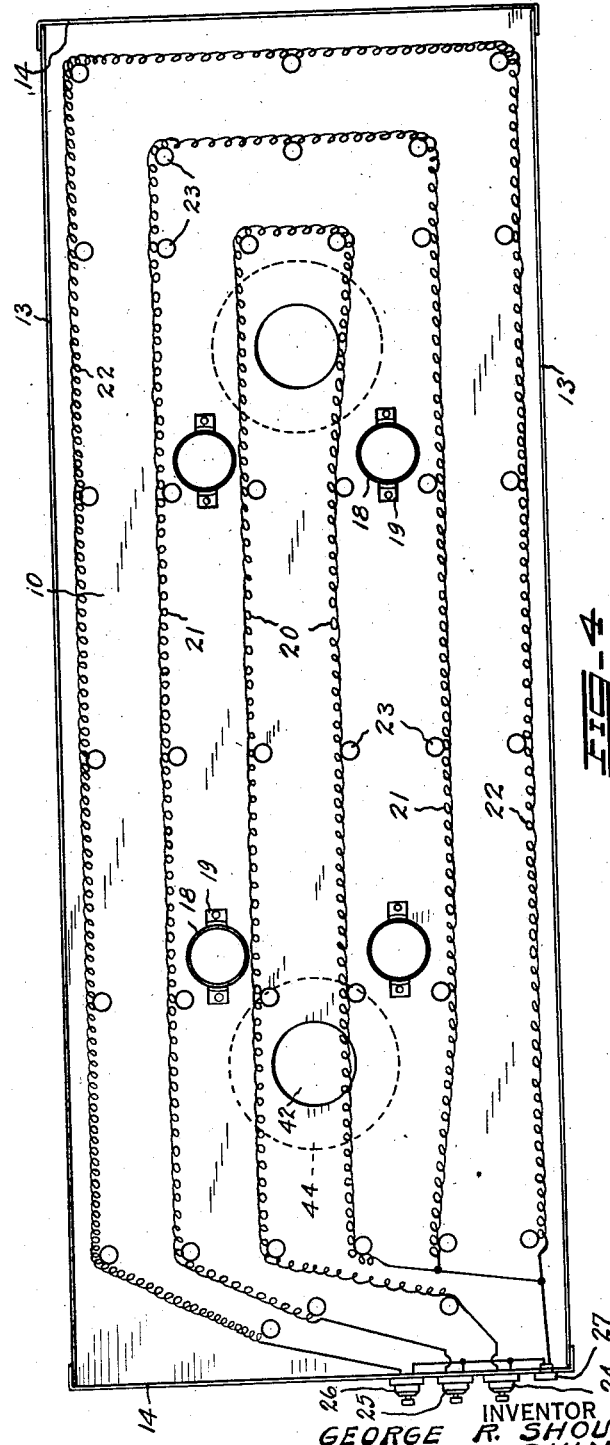
INVENTOR
GEORGE R. SHOUP
GEORGE E. QUINAN
BY
Fred C. Matheny
ATTORNEY Patented Apr. 22, 1930

UNITED STATES PATENT OFFICE

GEORGE R. SHOUP, OF PUYALLUP, AND GEORGE E. QUINAN, OF SEATTLE, WASHINGTON

POULTRY BROODER

Application filed May 3, 1927. Serial No. 188,503.

Our invention relates to improvements in poultry brooders, and the general object of our invention is to provide an electrically heated poultry brooder that is reliable and efficient in operation and that is relatively cheap and simple in construction whereby it may be built by an ordinary layman.

Other objects are to provide an electrically heated poultry brooder in which the electric heating elements are disposed below the floor of the poultry compartment and in which said floor is formed, of a good heat conducting and heat storage material, as sand placed on sheet metal, so that the heat from below can be readily transmitted through the floor without heating the upper surface of said floor to an undesirable temperature, the floor being kept warm and dry at all times and serving to absorb and hold considerable amount of heat and to give off this reserve heat in case the current to the electric heaters is shut off.

Another object is to provide a brooder in which the heat is supplied to a compartment beneath the floor of the poultry compartment and in which improved means are provided for insuring a steady flow of heated air from the lower heating compartment to the upper poultry compartment and thence out; thereby eliminating the possibility of cold drafts striking fowls within the upper poultry compartment.

Other and more specific objects will be apparent from the following description taken in connection with the accompanying drawings.

In poultry brooders of the form used for very young chickens it is desirable that the floor on which the chickens rest shall be warm and dry and that the compartment in which they are housed shall be warm and dry and well ventilated and kept at an even temperature. It is also desirable that the heating elements be located in a separate compartment from the chickens to thus avoid subjecting said chickens to excessive direct heat from the heating elements. It is further desirable that the brooder be constructed in such a manner as to be easily cleaned and to reduce to a minimum the danger of fire and that said brooder be capable of being built in a rectangular shape so that it will occupy the least possible space when placed in a rectangular room. We accomplish the objects hereinbefore set forth by providing a brooder that embodies a lower sheet metal housing unit arranged to receive the heating elements said lower housing having on its top a shallow sand receptacle and having air circulation conduits that extend from the interior of the housing to a distance above the sand receptacle. An upper housing unit is adapted to be placed on top of the lower housing unit to cooperate therewith in forming a poultry compartment. The sand in the receptacle at the top of the lower housing unit forms the floor for this poultry compartment and is always kept dry and warm by the heating elements which are located just below this floor, while the warm air from the lower compartment is circulated through the upper compartment warming and ventilating the same.

In the accompanying drawings Fig. 1, is a perspective view of a poultry brooder constructed in accordance with my invention, parts being broken away to reveal the interior construction.

Fig. 2, is a view in longitudinal section on broken line 2—2 of Fig. 1.

Fig. 3, is a cross section on broken line 3—3 of Fig. 1.

Fig. 4, is an underside view of the lower portion of the brooder wherein the heating elements are disposed.

Fig. 5, is a detached section illustrating the air vent construction.

Fig. 6, is a fragmentary isometric view of a corner of the lower housing unit.

Fig. 7 is a cross section on a smaller scale of another form of brooder having curtained openings on both sides instead of one side.

Like reference numerals designate like parts throughout the several views.

The drawings show a poultry brooder formed of a lower housing unit and an upper housing unit which are separable to facilitate construction and cleaning and to make them easier to handle. The lower section is formed of a rectangular plate 10, of sheet metal, having its outer edges bent upwardly as at 11, to afford, on the top of said plate, a shallow receptacle wherein sand may be placed as indicated at 12. This sand forms a suitable floor for the young fowls that use the brooder, protects them from direct contact with the sheet metal and also serves as a medium in which heat may be stored and given off as it is needed. Side plates 13 and end plates 14 are secured to the upwardly bent edges 11 and extend downwardly therefrom so as to co-operate with the top plate 10 in forming a lower heating compartment designated as 15. The end plates 14 and side plates 13 are preferably secured together at the corners as shown in Fig. 4. The end plates have ventilation openings 16 that are preferably covered by wire mesh 17. Tubular supports 18, four of which are shown in the drawings are secured by brackets 19 to the top plate 10 for supporting the central portion of the same, it being understood that said top plate is supported around the edges by the side and end plates 13 and 14.

Three independently controlled electric heating coils 20, 21 and 22 are suspended, by means of insulators 23, from the under side of the plate 10. The coils 20, 21 and 22 are distributed under the plate 10 as shown in Fig. 4, in such a manner as to heat the entire area of the plate to the best advantage. Separate switches 24, 25 and 26 located on the exterior of the brooder housing are connected in circuit with the respective coils for controlling said coils separately and independently from each other. We find that it is desirable to have the heating elements of different capacity, the coil 20 furnishing the greatest amount of heat, the coil 21 furnishing less than the coil 20 and the coil 22 furnishing less than the coil 21. The three coils combined are of sufficient capacity to heat the brooder in the coldest weather that will ordinarily be encountered, and for warmer weather any one or any two of the coils may be used, as may be needed, to furnish the desired amount of heat. A receptacle 27 may be provided to facilitate plugging in on a circuit for supplying current to the heating elements.

The upper housing unit, which is preferably formed of lumber, comprises a top 30, one full side 31, one partial side 32, and two ends 33. An opening 34, for the inlet and exit of fowls, extends throughout the length of the front side of the brooder below the partial side 32, and a curtain 35 of flexible material, as oil cloth, is secured by a bar 36, and hangs down to form a flexible closure for the opening 34. The top 30 is preferably connected by hinges 47, with the full side 31, and the partial side 32 is secured to the top 30. This permits the top to be raised, see dotted lines Fig. 3, to facilitate cleaning the brooder.

The young fowls that occupy the brooder pass over an inclined approach 37 and under the curtain 35 in entering or leaving the brooder. Posts 38, are secured within the four corners of the upper housing unit and project a short distance below the plane of the bottom of the same and are adapted to fit into the corners of the sand receptacle when the upper housing unit is placed on the lower housing unit to prevent relative displacement of said two housing units. The protruding portions of the posts 38 may be slightly longer than the depth of the sand receptacle to leave a narrow track 38' around the brooder between the two housing units for ventilation. The upper housing may be readily removed from the lower housing unit, or may be tilted up into a position as shown by dot and dash lines in Fig. 3, to afford free access to the interior, thus making the interior of the brooder easily accessible for cleaning, even though the cover 30 is not hinged but is rigidly secured to the ends 33 and side 31. We find that when the entire upper housing member is raised for cleaning, as shown by dot and dash lines Fig. 3, there is danger of catching small fowls under the ends 33 when said housing member is again lowered. When the cover 30 alone is raised this is not possible. A waterproof cover 39 may be placed on top member 30.

A free circulation of heated air directly from the heating compartment to the poultry compartment is permitted through air vent pipes 40 that are secured to the top side of the wall member 10 by brackets 41 and extend upwardly into the poultry compartment. Holes 42 are necessarily provided in the wall member 10 at the bottom ends of vent tubes 40. Brackets 43 secured to the upper ends of the vent tubes project above the same and serve as supports for horizontal deflector plates 44 by which heated air that passes upwardly through said vent tubes is directed sidewise and evenly distributed throughout the poultry compartment. Wire mesh 45 is preferably drawn around the brackets 43 and made fast to the same. Thorough air circulation is maintained at all times, the air entering through the end opening 16, being heated in the heating compartment, thence passing up into the poultry compartment and finally passing out at the front of said compartment. Suitable lamps 46 are provided in the poultry compartment for illumination.

In the operation of this brooder the same is set up as shown in the drawings and sand is placed in the sand receptacle. When current is supplied to the heating elements the lower compartment will be heated and the warm air will rise through the vents 40 and fill the upper poultry compartment. At the same time, the heating elements, being close to the sheet metal wall 10, will heat such wall, and this heat will gradually penetrate the body of sand on said wall 10 giving the young fowls a warm floor on which to roost but protecting them from direct contact with the sheet metal wall 10. The sand further serves as a heat reservoir which absorbs the heat slowly and gives it off slowly thus tending to maintain an even temperature in the poultry chamber at all times. The temperature of the brooder may be regulated by opening or closing the circuits to the several separate heating elements as desired.

The brooder is highly efficient in operation and is so simple in construction that it may be built by an ordinary layman without the use of special tools. The invention is especially well adapted to be embodied in the rectangular construction shown but is not restricted to this shape.

Fig. 7, shows one form of this brooder in which entrance openings 50 and curtains 51, similar to the previously described openings 34 and curtains 35, are provided along both sides of the brooder instead of only on one side. When this construction is employed two inclined approaches 52 are necessarily used, one on each side of the brooder. This type of brooder is advantageous when used in brooder houses where it is not subjected to drafts of air but the type shown in Fig. 3, is preferable for use in drafty places.

The foregoing description and accompanying drawings clearly disclose a preferred embodiment of our invention but it will be understood that this disclosure is merely illustrative and that such changes in the device may be made as are within the scope and spirit of the following claims.

We claim:

1. In a poultry brooder a lower housing unit embodying a rectangular horizontal sheet metal top plate, having its edges bent upwardly to afford a sand receptacle thereon, side plates secured to said upwardly bent edges and extending downwardly therefrom and co-operating with the top plate in forming a heating receptacle, said side plates having ventilation openings therein, insulator means secured to the lower side of said top plate, electric heating elements supported by said insulator means in slightly spaced relation from said top plate and distributed substantially uniformly throughout the entire area of said top plate, supports for the central portion of said top plate, vent tubes extending upwardly from said top plate and communicating with the heating receptacle therebelow, deflector plates supported above said vent tubes, a rectangular upper housing unit of box like shape open at the bottom and at one side and arranged to be removably supported on said lower housing unit to co-operate therewith in forming a poultry receptacle, means at the corners of said upper housing unit for engagement within the corners of said sand receptacle to prevent displacement of said upper housing unit, a flexible curtain arranged to serve as a closure for the open side of said upper housing unit and an inclined approach to said open side.

2. In a poultry brooder of the class described, a lower housing unit formed of a horizontal sheet metal top plate having its edges bent upwardly to afford a shallow receptacle for sand, sheet metal side and end plates secured to said upwardly bent edges and extending downwardly therefrom to form a heating compartment below said top plate, electric heating elements supported in spaced apart relation beneath said top plate, and substantially evenly distributed relative to the entire area of said top plate, air vent tubes carried by said top plate and extending upwardly therefrom into said heating compartment, deflector plates supported above the tops of said vent tubes, an upper box-like housing unit open at the bottom and removably supported on said lower housing unit, and forming a poultry compartment above the said top plate, posts at the corners of said upper housing unit for engagement within the corners of said sand receptacle to prevent relative displacement of said two units and allow said upper housing unit to be tilted upwardly into inclined position on said lower housing unit, a cover hinged to said upper housing unit and means in said upper housing unit forming inlet and exit openings for fowls.

GEORGE R. SHOUP.
GEORGE E. QUINAN.